(12) United States Patent
Moon et al.

(10) Patent No.: US 12,376,070 B2
(45) Date of Patent: Jul. 29, 2025

(54) ELECTRONIC DEVICE FOR CONTROLLING COMMUNICATION CIRCUIT BASED ON RECEPTION INTERVAL BETWEEN SS/PBCH BLOCK AND DATA AND METHOD FOR THE SAME

(71) Applicant: SAMSUNG ELECTRONICS CO., LTD., Suwon-si (KR)

(72) Inventors: Byungki Moon, Suwon-si (KR); Dongchul Ma, Suwon-si (KR); Sanghyun Lee, Suwon-si (KR); Sungbo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 375 days.

(21) Appl. No.: 17/942,320

(22) Filed: Sep. 12, 2022

(65) Prior Publication Data

US 2023/0043922 A1   Feb. 9, 2023

Related U.S. Application Data

(63) Continuation of application No. PCT/KR2022/005224, filed on Apr. 11, 2022.

(30) Foreign Application Priority Data

Aug. 9, 2021   (KR) .................. 10-2021-0104454

(51) Int. Cl.
*H04W 68/00* (2009.01)
*H04W 48/10* (2009.01)

(52) U.S. Cl.
CPC ......... *H04W 68/005* (2013.01); *H04W 48/10* (2013.01)

(58) Field of Classification Search
CPC ............ H04W 48/10; H04W 52/0216; H04W 68/005; H04W 76/27; H04W 76/28;
(Continued)

(56) References Cited

U.S. PATENT DOCUMENTS 10,772,054 B2   9/2020   Jung et al.
10,841,812 B2   11/2020  Kim et al.
(Continued)

FOREIGN PATENT DOCUMENTS

CN   112533232      3/2021
EP   3 621 275 A1   3/2020
(Continued)

OTHER PUBLICATIONS

International Search Report for PCT/KR2022/005224, mailed Jul. 12, 2022, 3 pages.
(Continued)

*Primary Examiner* — Hirdepal Singh
(74) *Attorney, Agent, or Firm* — NIXON & VANDERHYE P.C.

(57) ABSTRACT

In an electronic device and an operation method thereof, the electronic device may include: a memory; communication circuitry configured to transmit and receive data via a node; and a communication processor, wherein the communication processor may be configured to: identify a first time of receiving a paging message and a second time of receiving a synchronization signal/physical broadcast channel (SS/PBCH) block; determine, based on the first time and the second time satisfying a specified condition, the activation time of the communication circuitry based on the reception time of the paging message; receive a paging message; temporarily store the received paging message in the
(Continued)

memory; and process the stored paging message based on an SS/PBCH block received after reception of the paging message.

17 Claims, 18 Drawing Sheets

(58) Field of Classification Search
CPC ............ H04W 52/02; H04W 52/0219; H04W 52/0229; H04W 52/0235; H04W 52/028; H04W 56/0015; H04W 68/00; Y02D 30/70; H04J 11/00; H04J 11/0069; H04L 5/0048
USPC .......................................................... 455/458
See application file for complete search history.

(56) References Cited

U.S. PATENT DOCUMENTS

| | | |
|---|---|---|
| 2019/0191457 A1 | 6/2019 | Si et al. |
| 2019/0306828 A1 | 10/2019 | Kim et al. |
| 2020/0163054 A1 | 5/2020 | Liu et al. |
| 2020/0236646 A1 | 7/2020 | Liu et al. |
| 2020/0344703 A1 | 10/2020 | Zhao et al. |
| 2020/0367196 A1 | 11/2020 | Chen et al. |
| 2021/0058895 A1 | 2/2021 | Gao et al. |
| 2021/0105739 A1 | 4/2021 | Lin et al. |
| 2021/0329561 A1* | 10/2021 | Yu .................... H04W 52/0274 |
| 2021/0378000 A1* | 12/2021 | Zhang .................. H04L 5/0048 |
| 2022/0046540 A1 | 2/2022 | Kwon et al. |
| 2022/0116911 A1* | 4/2022 | Lee ........................ H04W 68/00 |
| 2022/0256458 A1 | 8/2022 | Noh et al. |
| 2023/0043922 A1 | 2/2023 | Moon et al. |
| 2023/0328690 A1* | 10/2023 | Xu ...................... H04W 72/232 370/329 |
| 2024/0171338 A1* | 5/2024 | Liu ..................... H04W 68/005 |

FOREIGN PATENT DOCUMENTS

| | | |
|---|---|---|
| KR | 10-2020-0057235 | 5/2020 |
| KR | 10-2020-0085877 | 7/2020 |
| KR | 10-2021-0012304 | 2/2021 |
| WO | 2020/060696 | 3/2020 |
| WO | 2020/143901 | 7/2020 |
| WO | WO 2020/164504 A1 | 8/2020 |
| WO | WO 2023/017950 A1 | 2/2023 |

OTHER PUBLICATIONS

Written Opinion of the ISA (with English translation) for PCT/KR2022/005224, mailed Jul. 12, 2022, 10 pages.
Extended European Search Report dated Sep. 26, 2024 for EP Application No. 22855952.2.

* cited by examiner

ELECTRONIC DEVICE FOR CONTROLLING COMMUNICATION CIRCUIT BASED ON RECEPTION INTERVAL BETWEEN SS/PBCH BLOCK AND DATA AND METHOD FOR THE SAME

CROSS-REFERENCE TO RELATED APPLICATIONS

This application is a continuation of International Application No. PCT/KR2022/005224 designating the United States, filed on Apr. 11, 2022, in the Korean Intellectual Property Receiving Office and claiming priority to Korean Patent Application No. 10-2021-0104454, filed on Aug. 9, 2021, in the Korean Intellectual Property Office, the disclosures of which are incorporated by reference herein in their entireties.

BACKGROUND

Field

The disclosure relates to an electronic device and operation method thereof and, for example, to a technique for controlling the communication circuitry based on a reception interval between the synchronization signal/physical broadcasting channel (SS/PBCH) block and data.

Description of Related Art

Efforts have been made to develop improved 5G or pre-5G communication systems to meet the ever increasing demand for wireless data traffic since the commercialization of 4G communication systems. As such, 5G or pre-5G communication systems are also called "beyond 4G network" or "post LTE system". To achieve high data rates, 5G communication systems are being considered for implementation in the extremely high frequency (mmWave) band (e.g., bands above 6 GHz) in addition to the band used by LTE (bands below 6 GHz). Techniques such as beamforming, massive multiple-input multiple-output (massive MIMO), full dimensional MIMO (FD-MIMO), array antennas, analog beamforming, and large scale antennas are considered for 5G communication systems.

An electronic device supporting 5G cellular communication may use a synchronization signal/physical broadcast channel (SS/PBCH) block to decode data received from a node. The electronic device may decode data based on a reference signal obtained through decoding of the SS/PBCH block. The SS/PBCH block may be received with a designated periodicity (e.g., 20 ms).

In a radio resource control (RRC) idle state, the electronic device may transition the communication circuitry to an active state to receive a paging message. The electronic device may receive a SS/PBCH block broadcast before receiving a paging message, and perform decoding of the paging message based on a reference signal obtained through decoding of the SS/PBCH block.

After receiving the SS/PBCH block, the electronic device may maintain the communication circuitry in an active state until reception of a paging message. The transmission periodicity of the SS/PBCH block may be different from the transmission periodicity of the paging message, and hence the interval between receiving the SS/PBCH block and receiving the paging message may be lengthened. When the interval between receiving the SS/PBCH block and receiving the paging message becomes longer, power consumed by the communication circuitry may increase.

SUMMARY

An electronic device according to various example embodiments of the disclosure may include: a memory; communication circuitry configured to transmit and receive data via a node; and a communication processor, wherein the communication processor may be configured to: identify a first time of receiving a paging message and a second time of receiving a synchronization signal/physical broadcast channel (SS/PBCH) block; determine, based on the first time and the second time satisfying a specified condition, the activation time of the communication circuitry based on the reception time of the paging message; receive a paging message; temporarily store the paging message in the memory; and process the stored paging message based on an SS/PBCH block received after reception of the paging message.

An electronic device according to various example embodiments of the disclosure may include: a memory; communication circuitry configured to transmit and receive data via a node; and a communication processor, wherein the communication processor may be configured to: identify a first time, the first time being a start time of an on-duration period in which data reception is possible in a connected mode discontinuous reception (C-DRX) mode, and a second time of receiving a synchronization signal/physical broadcast channel (SS/PBCH) block; determine, based on the first time and the second time satisfying a specified condition, the activation time of the communication circuitry based on the start time of the on-duration period; receive data; temporarily store the received data in the memory; and process the stored data based on an SS/PBCH block received during the on-duration period.

An electronic device according to various example embodiments of the disclosure may include: a memory; communication circuitry configured to transmit and receive data via a node; and a communication processor, wherein the communication processor may be configured to: identify a first time of receiving a wake-up signal indicating presence of data to be transmitted in an on-duration period in which data can be received in a connected mode discontinuous reception (C-DRX) mode and a second time of receiving a synchronization signal/physical broadcast channel (SS/PBCH) block; determine, based on the first time and the second time satisfying a specified condition, the activation time of the communication circuitry based on the first time; receive the wake-up signal; temporarily store the received wake-up signal in the memory; and process the stored wake-up signal based on an SS/PBCH block received during the on-duration period.

A method of operating an electronic device according to various example embodiments of the disclosure may include: identifying a first time of receiving a paging message and a second time of receiving an SS/PBCH block; determining, based on the first time and the second time satisfying a specified condition, an activation time of communication circuitry based on the reception time of the paging message; receiving a paging message; temporarily storing the received paging message in a memory; and processing the stored paging message based on an SS/PBCH block received after reception of the paging message.

In the electronic device and operation method thereof, when the interval between a first time of receiving a paging message and a second time of receiving an SS/PBCH block satisfies a specified condition, decoding of the paging message may be performed using the SS/PBCH block transmitted after reception of the paging message. Hence, the electronic device may activate the communication circuitry at the time of receiving a paging message to receive the paging message and the SS/PBCH block, and may maintain the communication circuitry an inactive state between the reception time of the SS/PBCH block and the reception time of the paging message, thereby reducing power consumption.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
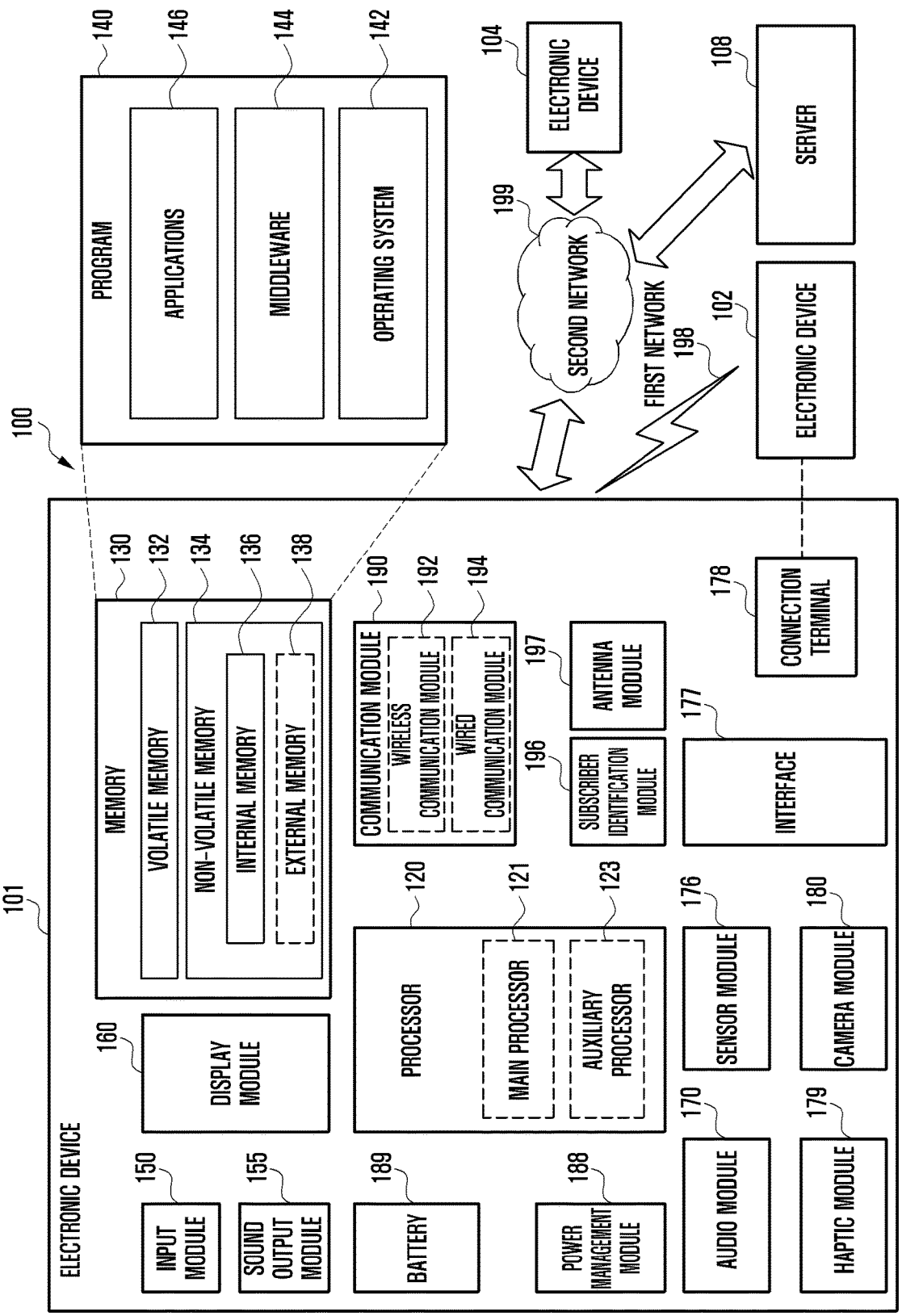
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1 module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input 1 module 150 may receive a command or data to be used by another component (e.g., the processor 120) of the electronic device 101, from the outside (e.g., a user) of the electronic device 101. The input 1 module 150 may include, for example, a microphone, a mouse, a keyboard, a key (e.g., a button), or a digital pen (e.g., a stylus pen).

The sound output 1 module 155 may output sound signals to the outside of the electronic device 101. The sound output 1 module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display 1 module 160 may visually provide information to the outside (e.g., a user) of the electronic device 101. The display 1 module 160 may include, for example, a display, a hologram device, or a projector and control circuitry to control a corresponding one of the display, hologram device, and projector. According to an embodiment, the display 1 module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1 module 150, or output the sound via the sound output 1 module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
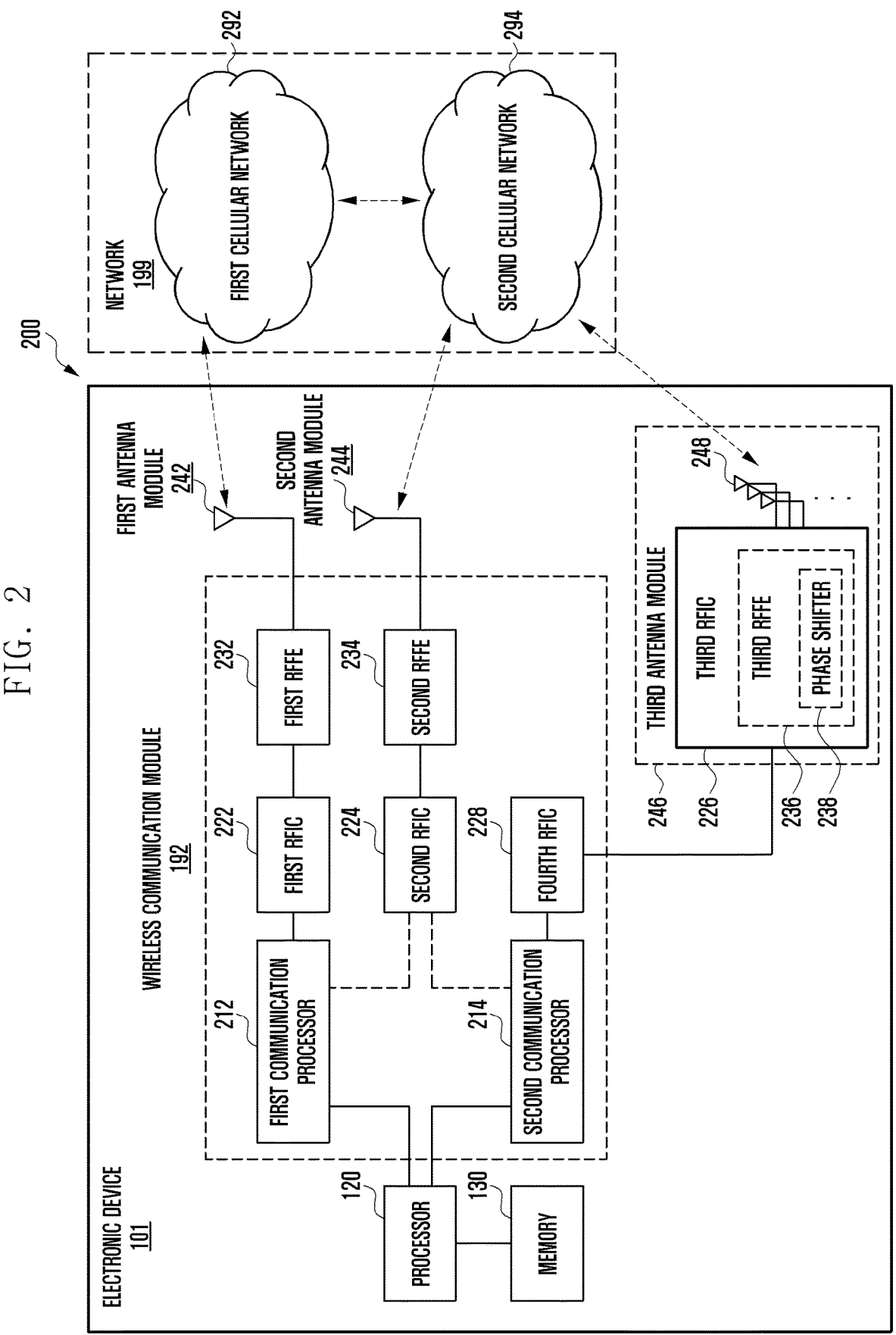
FIG. 2 is a block diagram illustrating an example configuration of an electronic device for supporting legacy network communication and 5G network communication according to various embodiments.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor (e.g., including processing circuitry) 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
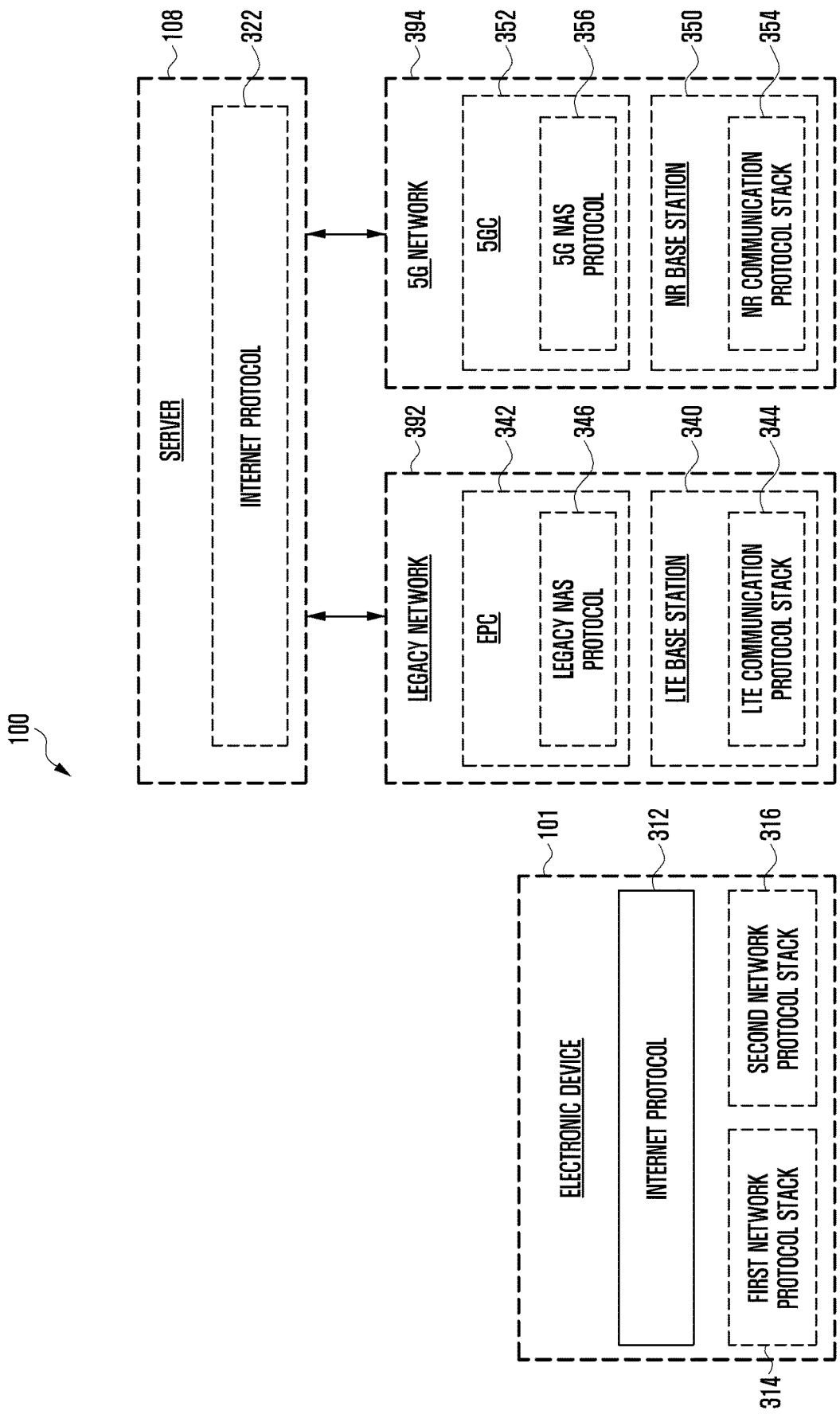
FIG. 3 is a diagram illustrating the structure of protocol stacks for legacy communication and/or 5G communication according to various embodiments.

FIG. 3 is a diagram illustrating an example protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and anon-access stratum (NAS) layer. The RRC layer may process control, for example, data related to radio bearer setup, paging, or mobility management. The NAS may process, for example, a control message related to authentication, registration, or mobility management.

Figure 4A:
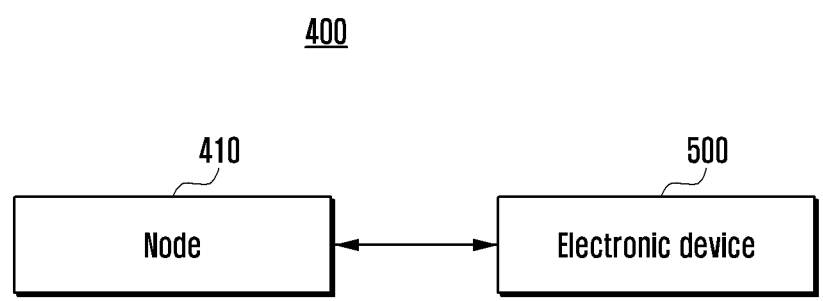
FIG. 4A is a block diagram illustrating an example configuration of an electronic device and a cellular network according to various embodiments.

FIG. 4A is a block diagram illustrating an example configuration of an electronic device and a cellular network according to various embodiments.

According to various embodiments of the disclosure, the cellular network 400 may include a node 410 (e.g., NR base station 350 in FIG. 3).

According to various embodiments of the disclosure, the node 410 may include a base station supporting first cellular communication. The first cellular communication may refer to any of various cellular communication schemes supported by the electronic device 500, for example, a communication scheme on the second cellular network 294 in FIG. 2. For example, the first cellular communication may be one of 5G mobile communication methods (e.g., communication method using FR1 being a frequency band of 6 GHz or less, or communication method using FR2 being is a frequency band of 6 GHz or higher). According to an embodiment, the node 410 may be a node that outputs a signal of a first frequency band (e.g., frequency band of 6 GHz or higher).

The electronic device 500 may perform registration on the cellular network 400, and may transmit and/or receive various data to and from an external electronic device (e.g., electronic device 104 in FIG. 1) through the node 410.

Before registering on the cellular network 400, the electronic device 500 may receive a synchronization signal/physical broadcast channel block (SS/PBCH block) broadcast by the node 410. The SS/PBCH block may include data required when the electronic device 500 searches for a node 410 to which the electronic device 500 is to be connected, and the SS/PBCH block may be broadcast by the node 410 at a specified periodicity (e.g., 20 ms).

The electronic device 500 may decode the SS/PBCH block and synchronize with the node 410 based on a reference signal obtained through decoding. The electronic device 500 may obtain system information (SI) through a physical broadcast channel (PBCH) included in the SS/PBCH block. Through the system information, the electronic device 500 may obtain identification information (or physical identification information) of the node 410, information related to a paging message, and/or a system frame number of the SS/PBCH block.

The electronic device 500 may access the node 410 based on the obtained information, and may perform a registration procedure with the cellular network 400 corresponding to the node 410. The electronic device 500 may receive identification information (UE_ID) of the electronic device 500 from the cellular network 400 while performing the registration procedure with the cellular network 400. Based on information related to a paging message included in the system information and the identification information of the electronic device 500, the electronic device 500 may identify the reception cycle of the paging message and frame information (e.g., frame number) including the paging message.

After the registration procedure with the cellular network 400 is completed, the electronic device 500 may transition from RRC connected state to RRC idle state. The electronic device 500 may transmit and/or receive data in RRC connected state, and may not transmit and/or receive data in idle state. The electronic device 500 may perform a series of operations to transition to RRC connected state upon receiving a paging message in idle state. To check whether a paging message is received, the electronic device 500 may perform a series of operations (e.g., transitioning the wireless communication module 192 in FIG. 1 from an inactive state to an active state) at each reception cycle of the paging message to receive a paging message.

Figure 4B:
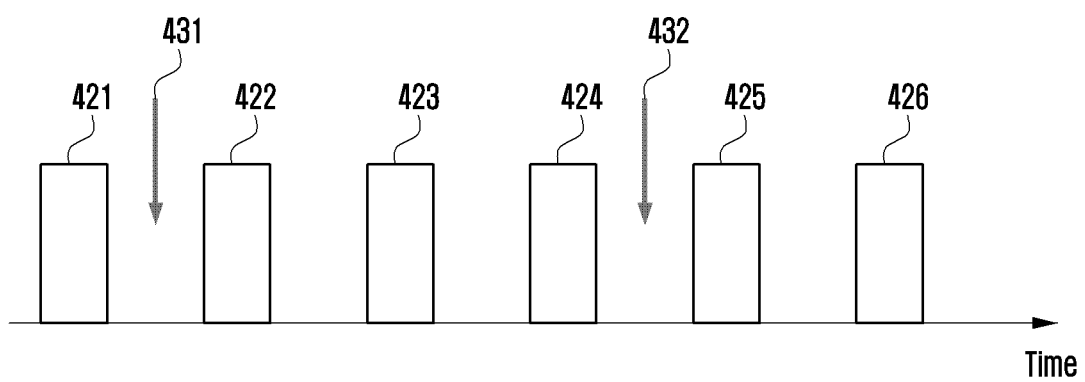
FIG. 4B is a diagram illustrating an example in which the electronic device receives a paging message and an SS/PBCH block according to various embodiments.

FIG. 4B is a diagram illustrating an example in which the electronic device receives a paging message and a synchronization signal/physical broadcast channel block (SS/PBCH block) according to various embodiments.

The node (e.g., node 410 in FIG. 4A) of the cellular network (e.g., cellular network 400 in FIG. 4A) may broadcast an SS/PBCH block 421, 422, 423, 424, 425 or 426 at specified intervals (e.g., 20 ms). The SS/PBCH block may include a reference signal for decoding a signal transmitted by the node 410.

The electronic device 500 may control the communication circuitry (e.g., wireless communication circuitry 192 in FIG. 1) based on the transmission periodicity of the SS/PBCH block 421, 422, 423, 424, 425 or 426 and the transmission periodicity of a paging message 431 or 432 obtained during registration with the cellular network 400. The electronic device 500 may transition the communication circuitry 192 to an active state to receive the SS/PBCH block 421, 422, 423, 424, 425 or 426 based on the transmission periodicity of the SS/PBCH block 421, 422, 423, 424, 425 or 426. After reception of the SS/PBCH block 422, 423, 425 or 426 is completed, the electronic device 500 may transition the communication circuitry 192 to an inactive state. However, the electronic device 500 may maintain the communication circuitry 192 in an active state and wait for reception of the paging message 431 or 432 based on confirming that the reception cycle of the paging message 431 or 432 expires after reception of the SS/PBCH block 421 or 424 and before reception of another SS/PBCH block 422 or 425.

Figure 4C:
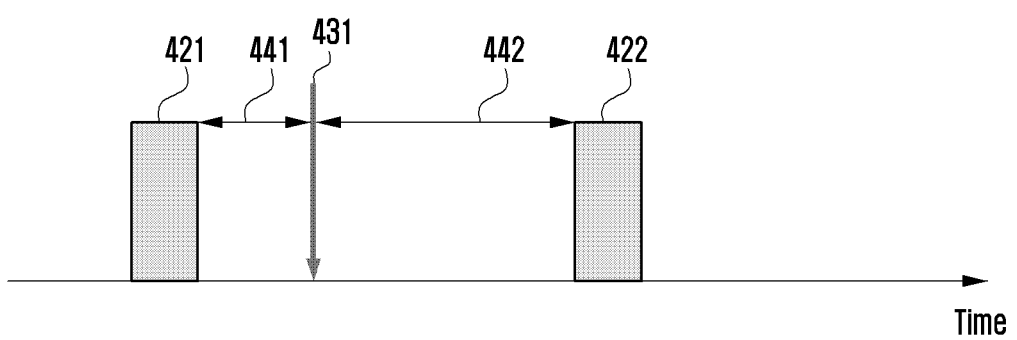
FIG. 4C is a diagram illustrating an example in which the electronic device processes a paging message based on an SS/PBCH block received before receiving the paging message according to various embodiments.

FIG. 4C is a diagram illustrating an example in which the electronic device processes a paging message based on an SS/PBCH block received before receiving the paging message according to various embodiments.

Upon confirming that the reception cycle of the paging message expires after reception of the SS/PBCH block 421 and before reception of another SS/PBCH block 422, the electronic device 500 may maintain the communication circuitry (e.g., wireless communication circuitry 192 in FIG. 1) in an active state for an interval 441 after reception of the SS/PBCH block 421 and before reception of the paging message 431. The electronic device 500 may decode the SS/PBCH block 421 to extract a reference signal, receive the paging message 431, and then decode the paging message 431 based on the reference signal. The electronic device 500 may transition the communication circuitry 192 to an inactive state for an interval 442 after reception of the paging message 431 and before reception of another SS/PBCH block 422.

Figure 4D:
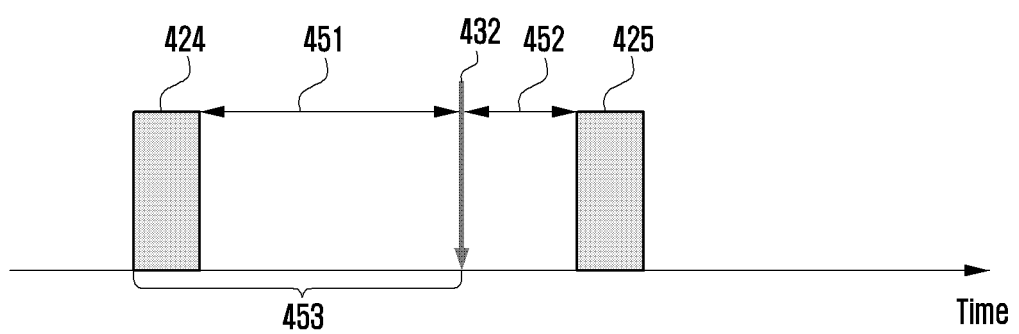
FIG. 4D is a diagram illustrating an example in which the electronic device processes a paging message based on an SS/PBCH block received before receiving the paging message according to various embodiments.

FIG. 4D is a diagram illustrating an example in which the electronic device processes a paging message based on an SS/PBCH block received before receiving the paging message according to various embodiments.

Upon confirming that the reception cycle of the paging message expires after reception of the SS/PBCH block 424 and before reception of another SS/PBCH block 425, the electronic device 500 may maintain the communication circuitry (e.g., wireless communication circuitry 192 in FIG. 1) in an active state for an interval 451 after reception of the SS/PBCH block 424 and before reception of the paging message 432. The electronic device 500 may decode the SS/PBCH block 424 to extract a reference signal, receive the paging message 432, and then decode the paging message 432 based on the reference signal. The electronic device 500 may transition the communication circuitry 192 to an inactive state for an interval 452 after reception of the paging message 432 and before reception of another SS/PBCH block 425.

With reference to FIG. 4D, the electronic device 500 may maintain the communication circuitry 192 in an active state for an interval 451 after reception of the SS/PBCH block 424 and before reception of the paging message 432. When the interval 451 is lengthened, as the active state of the communication circuitry 192 is maintained for a long time, power consumption of the electronic device 500 may increase.

A description is given of specific embodiments for controlling the communication circuitry 192 based on the interval between the reception time of the SS/PBCH block 424 and the reception time of the paging message 432 to reduce the power consumption of the electronic device 500 below.

Figure 5:
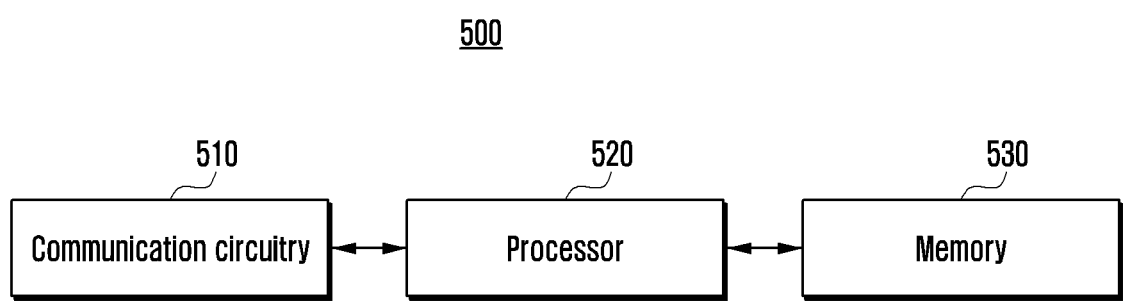
FIG. 5 is a block diagram illustrating an example configuration of an electronic device according to various embodiments.

FIG. 5 is a block diagram illustrating an example configuration of an electronic device according to various embodiments.

With reference to FIG. 5, the electronic device 500 (e.g., electronic device 101 in FIG. 1) according to various embodiments of the disclosure may include communication circuitry 510 (e.g., wireless communication module in FIG. 1), a processor (e.g., including processing circuitry) 520 (e.g., processor 120 in FIG. 1, first communication processor 212 and/or second communication processor 242 in FIG. 2), and/or a memory 530 (e.g., memory 130 in FIG. 1).

The processor 520 may be operably connected to the communication circuitry 510 and/or the memory 530. The processor 520 may include various processing circuitry and control components of the electronic device 500. For example, the processor 520 may control the components of the electronic device 500 according to one or more instructions stored in the memory 530. According to an embodiment, the memory 530 may be a component included in one chip (e.g., modem) in which the processor 520 and the communication circuitry 510 are implemented.

The communication circuitry 510 may enable the electronic device 500 to communicate with an external electronic device (e.g., external electronic device 104 in FIG. 1) through at least one network (e.g., legacy network 392 or 5G network 394 in FIG. 3). For example, the communication circuitry 510 may support communication between the electronic device 500 and the external electronic device 104 through a node (e.g., node 410 in FIG. 4A) under the control of the processor 520.

The processor 520 may control the communication circuitry 510 to perform registration on the cellular network 400 to perform cellular communication. Before registration on the cellular network 400, the processor 520 may receive a synchronization signal/physical broadcast channel (SS/PBCH) block broadcast by the node 410. The SS/PBCH block is data required when the electronic device 500 searches for a node 410 to which it is to be connected, and The SS/PBCH block may be broadcast by the node 410 at a specified periodicity (e.g., 20 ms).

The processor 520 may decode the SS/PBCH block and synchronize with the node 410 based on a reference signal obtained through decoding. The processor 520 may obtain system information (SI) through a physical broadcast channel (PBCH) included in the SS/PBCH block. The processor 520 may obtain identification information (or, physical identification information) of the node 410, information related to a paging message, and/or a system frame number of the SS/PBCH block through the system information. Based on the system frame number of the SS/PBCH block included in the system information and the reception time of the SS/PBCH block, the processor 520 may identify the reception time of another SS/PBCH block (or, reception time of an SS/PBCH block close to the reception time of a paging message).

The processor 520 may access the node 410 based on the obtained information, and may perform a registration procedure with the cellular network 400 corresponding to the node 410. The processor 520 may receive identification information (UE_ID) of the electronic device 500 from the cellular network 400 while performing a registration procedure with the cellular network 400. Based on the information related to a paging message included in the system information and the identification information of the electronic device 500, the processor 520 may identify the reception periodicity of the paging message and information about the frame (e.g., frame number) including a paging message. The processor 520 may identify a time point at which a paging message is received based on the reception periodicity of the paging message and the information about a frame including a paging message.

The processor 520 may transition from RRC connected state to RRC idle state after the registration procedure with the cellular network 400 is completed. The electronic device 500 may be allowed to transmit and/or receive data in RRC connected state, and may be not allowed to transmit and/or receive data in RRC idle state. The processor 520 may deactivate the communication circuitry 510 in RRC idle state, and may activate the communication circuitry 510 in RRC connected state.

The processor 520 may perform a series of operations for transitioning to RRC connected state in response to reception of a paging message in idle state. To check whether a paging message is received, the processor 520 may perform a series of operations for receiving a paging message at each reception cycle of a paging message. Next, to reduce power consumption of the electronic device 500, a description is given of specific embodiments of controlling the communication circuitry 192 based on the interval between the reception time of the SS/PBCH block and the reception time of the paging message 432.

The processor 520 may identify a first time of receiving a paging message (e.g., paging message 432 in FIG. 4D) and a second time of receiving an SS/PBCH block (e.g., SS/PBCH block 424 in FIG. 4D).

The processor 520 may check whether the first time and the second time satisfy a specified condition. According to an embodiment, the processor 520 may identify the interval 451 between the first time and the second time and check whether the identified interval satisfies a specified condition. The specified condition may include a condition on whether the interval 451 between the first time and the second time is greater than or equal to a specified value. The specified value is a value related to the reception periodicity of the SS/PBCH block 424, and the specified value may be half the reception periodicity of the SS/PBCH block 424 according to an embodiment. When the reception periodicity of the SS/PBCH block 424 is 20 ms, the specified value may be 10 ms.

Based on the identified interval 451 satisfying the specified condition, the processor 520 may process the paging message 432 using the SS/PBCH block 425 received after reception of the paging message 432 other than the SS/PBCH block 424 received before reception of the paging message 432. Upon determining to process the paging message 432 using the SS/PBCH block 425 received after reception of the paging message 432, the processor 520 may determine the activation time of the communication circuitry 510 based on the second time at which the paging message 432 is received. According to an embodiment, the processor 520 may control the communication circuitry 510 to be activated at the second time when the paging message 432 is received or at a specified time before the second time. The second time or a specified time before the second time may be after the reception time of the SS/PBCH block 424. Through the above method, the processor 520 may maintain the communication circuitry 510 in an inactive state for the interval 453 (refer to FIG. 4D) between the reception time of the paging message 432 and the reception time of the SS/PBCH block 424, reducing the power (or, current) consumed due to the active state of the communication circuitry 510.

The processor 520 may activate the communication circuitry 510 before receiving the paging message 432 and control the communication circuitry 510 to receive the paging message 432. The processor 520 may temporarily store the received paging message 432 in the memory 530. After receiving the paging message 432, the processor 520 may receive the SS/PBCH block 425 and decode the SS/PBCH block 425 to extract a reference signal. The processor 520 may decode the paging message 432 being temporarily stored in the memory 530 using the extracted reference signal. The processor 520 may determine whether to transition from RRC idle state to RRC connected state based on the information extracted through decoding of the paging message 432.

Based on the identified interval 451 not satisfying the specified condition, the processor 520 may process the paging message 432 using the SS/PBCH block 424 received before reception of the paging message 432.

Based on the identified interval 451 not satisfying the specified condition, the processor 520 may activate the communication circuitry 510 at the reception time of the SS/PBCH block 424 received at the reception time of the paging message 432 or at a specified time before the reception time of the SS/PBCH block 424. After activating the communication circuitry 510, the processor 520 may receive the SS/PBCH block 424 and decode the SS/PBCH block 424 to extract a reference signal. The processor 520 may maintain the communication circuitry 510 in an active state after reception of the SS/PBCH block 424 up to the reception time of the paging message 432. The processor 520 may receive the paging message 432 and decode the paging message 432 using the extracted reference signal. The processor 520 may determine whether to transition from RRC idle state to RRC connected state based on the information extracted through decoding of the paging message 432.

Referring to the example described above, the electronic device 500 may perform decoding of the paging message 432 using the SS/PBCH block received at a time closest to the reception time of the paging message 432. Consequently, the electronic device 500 may decrease the time for the communication circuitry 510 to remain in an active state between the reception time of the paging message 432 and the reception time of the SS/PBCH block by reducing the interval between the paging message 432 and the SS/PBCH block, reducing power consumption due to the communication circuitry 510.

The disclosure can also be applied to data other than a paging message. The same may be applied to data received during the on-duration period in which the electronic device 500 performs data reception in connected mode discontinuous reception (C-DRX) mode. Various example embodiments will be described in greater detail below with reference to FIGS. 7A, 7B, 8A, 8B and 8C.

Figure 6A:
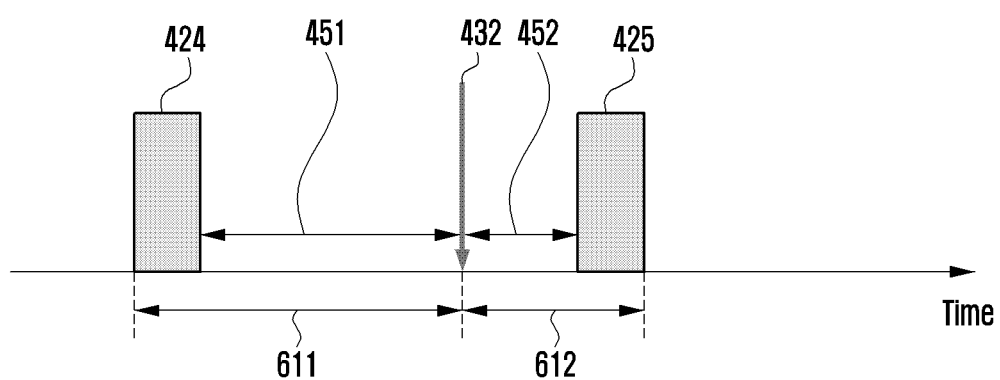
FIG. 6A is a diagram illustrating an example in which the electronic device determines the activation time of the communication circuitry when the interval between the reception time of an SS/PBCH block and the reception time of a paging message satisfies a specified condition according to various embodiments.

FIG. 6A is a diagram illustrating an example in which the electronic device determines the activation time of the communication circuitry when the interval between the reception time of an SS/PBCH block and the reception time of a paging message satisfies a specified condition according to various embodiments.

With reference to FIG. 6A, the electronic device 500 may identify the interval 451 between a first time of receiving a paging message (e.g., paging message 432 in FIG. 4D) and a second time of receiving an SS/PBCH block (e.g., SS/PBCH block 424 in FIG. 4D). The electronic device 500 may check whether the identified interval satisfies a specified condition. The specified condition may include a condition on whether the interval 451 between the first time and the second time is greater than or equal to a specified value. The specified value is a value related to the reception periodicity of the SS/PBCH block 424, and the specified value may be half the reception periodicity of the SS/PBCH block 424 according to an embodiment. In this case, the interval 451 between the first time and the second time may be greater than the interval 452 between the second time and a third time of receiving the SS/PBCH block 425 after reception of the paging message 432.

Based on the identified interval 451 satisfying the specified condition, the electronic device 500 may process the paging message 432 using the SS/PBCH block 425 received after reception of the paging message 432 other than the SS/PBCH block 424 received before reception of the paging message 432. Upon determining to process the paging message 432 using the SS/PBCH block 425 received after reception of the paging message 432, the electronic device 500 may determine the activation time of the communication circuitry 510 based on the second time at which the paging message 432 is received. According to an embodiment, the electronic device 500 may control the communication circuitry 510 to be activated at the second time when the paging message 432 is received or at a specified time before the second time. The second time or a specified time before the second time may be after the reception time of the SS/PBCH block 424. Through the above method, the electronic device 500 may maintain the communication circuitry 510 in an inactive state for the interval 611 between the reception time of the paging message 432 and the reception time of the SS/PBCH block 424. The electronic device 500 may maintain the communication circuitry 510 in an active state for the interval 612 between the reception time of the paging message 432 and the reception time of the SS/PBCH block 425.

When the electronic device 500 fails to process the paging message 432, it may maintain the active state of the communication circuitry 510 until a next paging message (not shown) is received.

Through the above method, the electronic device 500 may reduce the power (or, current) consumed due to the active state of the communication circuitry 510.

Figure 6B:
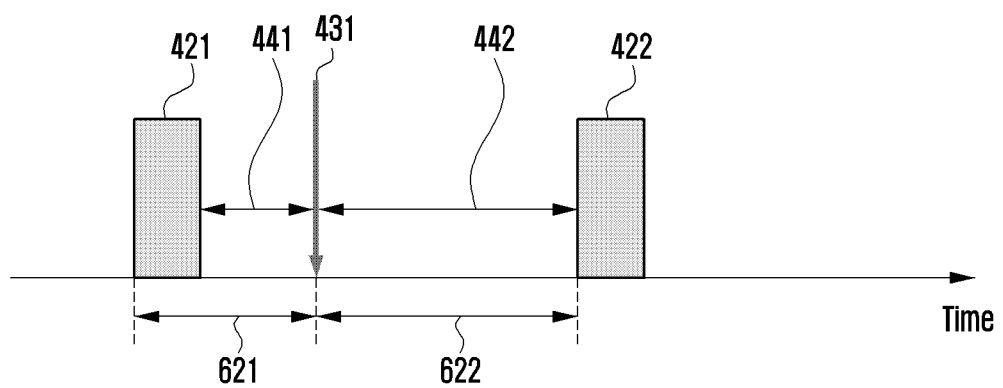
FIG. 6B is a diagram illustrating an example in which the electronic device determines the activation time of the communication circuitry when the interval between the reception time of an SS/PBCH block and the reception time of a paging message does not satisfy a specified condition according to various embodiments.

FIG. 6B is a diagram illustrating an example in which the electronic device determines the activation time of the communication circuitry when the interval between the reception time of an SS/PBCH block and the reception time of a paging message does not satisfy a specified condition according to various embodiments.

With reference to FIG. 6B, the electronic device 500 may identify the interval 441 between a first time of receiving a paging message (e.g., paging message 431 in FIG. 4D) and a second time of receiving an SS/PBCH block (e.g., SS/PBCH block 421 in FIG. 4D). The electronic device 500 may check whether the identified interval satisfies a specified condition. The specified condition may include a condition on whether the interval 441 between the first time and the second time is greater than or equal to a specified value. The specified value is a value related to the reception periodicity of the SS/PBCH block 421, and the specified value may be half the reception periodicity of the SS/PBCH block 421 according to an embodiment. In this case, the interval 441 between the first time and the second time may be less than the interval 442 between the second time and a third time of receiving the SS/PBCH block 422 after reception of the paging message 432.

Based on the identified interval 441 not satisfying the specified condition, the electronic device 500 may activate the communication circuitry 510 at the reception time of the SS/PBCH block 421 received at the reception time of the paging message 431 or at a specified time before the reception time of the SS/PBCH block 421. After activating the communication circuitry 510, the electronic device 500 may receive the SS/PBCH block 421 and decode the SS/PBCH block 421 to extract a reference signal. The electronic device 500 may maintain the communication circuitry 510 in an active state for an interval 621 between reception of the SS/PBCH block 421 and the reception time of the paging message 431. The electronic device 500 may receive the paging message 431 and decode the paging message 431 using the extracted reference signal.

The electronic device 520 may determine whether to transition from RRC idle state to RRC connected state based on the information extracted through decoding of the paging message 431. To remain in RRC idle state, the electronic device 500 may receive the paging message 431 and then transition the communication circuitry 510 to an inactive state and remain therein (622). The electronic device 400 may maintain the communication circuitry 510 in an inactive state until reception of the SS/PBCH block 424 received before reception of a next paging message (e.g., paging message 432 in FIG. 4A).

When the electronic device 500 fails to process the paging message 431, it may maintain the active state of the communication circuitry 510 until the next paging message (e.g., paging message 432 in FIG. 4A) is received.

Figure 7A:
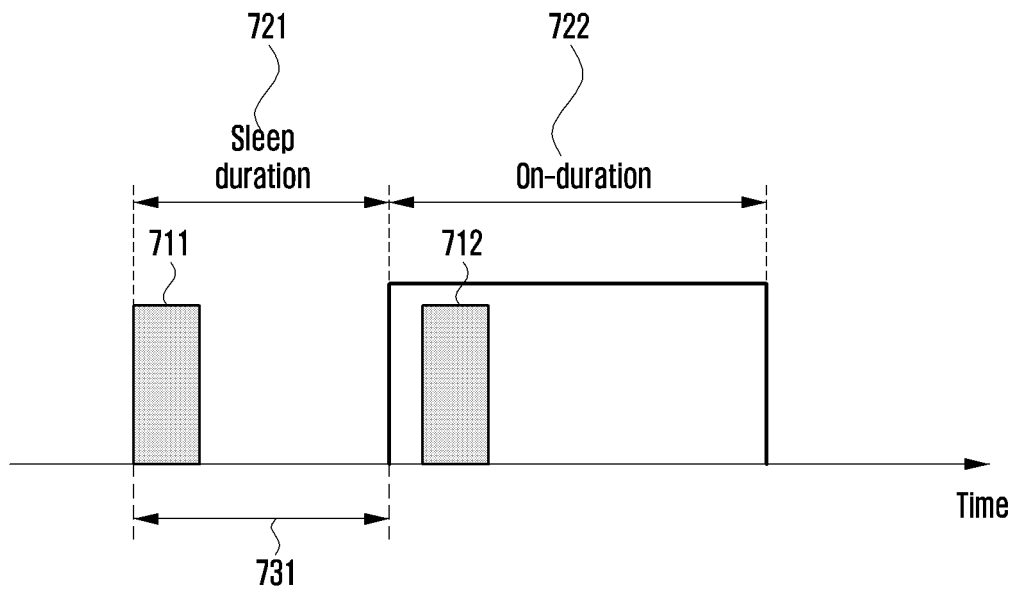
FIG. 7A is a diagram illustrating an example in which the electronic device in C-DRX mode receives an SS/PBCH block according to various embodiments.

FIG. 7A is a diagram illustrating an example in which the electronic device in C-DRX mode receives an SS/PBCH block according to various embodiments.

With reference to FIG. 7A, the electronic device (e.g., electronic device 500 in FIG. 5) may support connected mode discontinuous reception (C-DRX) mode.

The C-DRX mode may be a mode in which the electronic device 500 in RRC connected state does not receive data for a specific period (e.g., sleep duration) and receives data for another specific period (e.g., on duration), and may be a mode capable of reducing power consumed by the communication circuitry (e.g., communication circuitry 510 in FIG. 5) by transitioning the communication circuitry 510 to an inactive state for the sleep duration.

The node 410 may broadcast an SS/PBCH block 711 or 712 at a specified periodicity (e.g., 20 ms). The electronic device 500 may transition the communication circuitry 510 to an active state during the sleep duration 721 to receive the SS/PBCH block 711 before the on duration 722. The electronic device 500 (or, processor 520) may decode the received SS/PBCH block 711 and synchronize with the node 410 based on a reference signal obtained through decoding. The electronic device 500 (or, processor 520) may decode data received during the on duration 722 based on the reference signal.

The electronic device 500 may maintain the communication circuitry 510 in an active state for the on duration 722. However, to decode data to be received during the on duration 722, the electronic device 500 may transition the communication circuitry 510 to an active state for a period 731 of the sleep duration 721. As the communication circuitry 510 is transitioned to an active state in the period 731 of the sleep duration 721, power consumed by the communication circuitry 510 may increase.

Figure 7B:
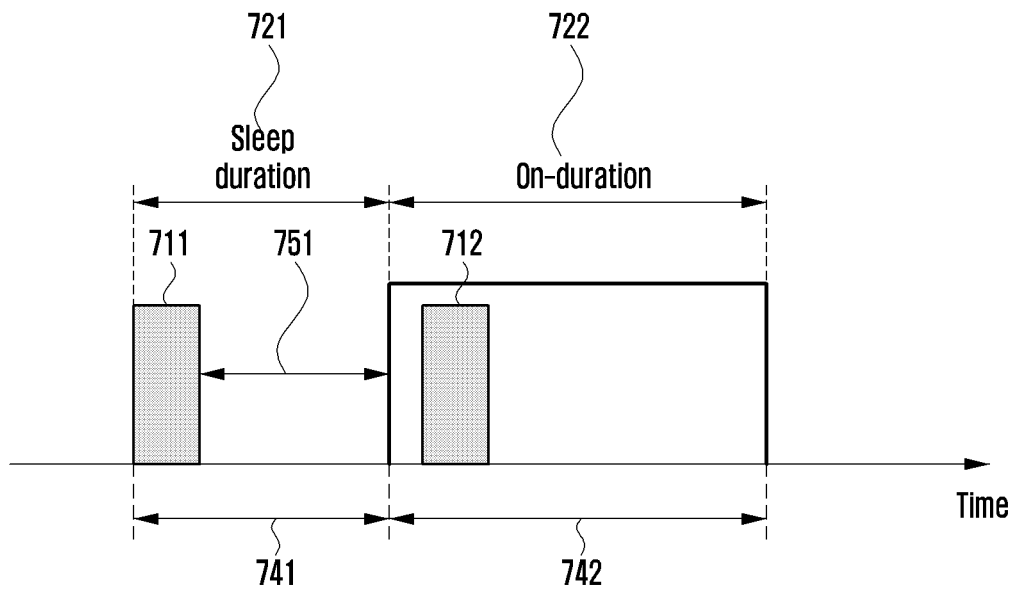
FIG. 7B is a diagram illustrating an example in which the electronic device in C-DRX mode determines the activation time of the communication circuitry based on the interval between the reception time of an SS/PBCH block and the start time of the on-duration period according to various embodiments.

FIG. 7B is a diagram illustrating an example in which the electronic device in C-DRX mode determines the activation time of the communication circuitry based on the interval between the reception time of an SS/PBCH block and the start time of the on-duration period according to various embodiments.

The electronic device 500 (or, processor 520) may identify the interval 751 between a first time being the start time of the on duration 722 and a second time of receiving the SS/PBCH block 711. The electronic device 500 (or, processor 520) may check whether the identified interval 751 satisfies a specified condition. The specified condition may include a condition on whether the interval 751 between the first time and the second time is greater than or equal to a specified value. The specified value may include a value related to the reception periodicity of the SS/PBCH block 711 or 712, and the specified value may be half the reception periodicity of the SS/PBCH block 711 or 712 according to an embodiment. When the reception periodicity of the SS/PBCH block 711 or 712 is 20 ms, the specified value may be 10 ms.

Based on the identified interval 751 satisfying the specified condition, the electronic device 500 (or, processor 520) may process the received data using the SS/PBCH block 712 received after the start time of the on-duration period 722 other than the SS/PBCH block 711 received before the start time of the on-duration period 722. Upon determining to process data using the SS/PBCH block 712 received after the start time of the on-duration period 722, the electronic device 500 (or, processor 520) may determine the activation time of the communication circuitry 510 based on the start time of the on-duration period 722. According to an embodiment, the electronic device 500 (or, processor 520) may control the communication circuitry 510 to be activated at the start time of the on-duration period 722 or at a specified time before the start time of the on-duration period 722. The second time or a specified time before the second time may be after the reception time of the SS/PBCH block 711.

The electronic device 500 (or, processor 520) may temporarily store data received before reception of the SS/PBCH block 712 in the memory (e.g., memory 530 in FIG. 5). The electronic device 500 (or, processor 520) may receive the SS/PBCH block 712, and decode the SS/PBCH block 712 to extract a reference signal. The electronic device 500 (or, processor 520) may decode the data stored in the memory 530 based on the reference signal.

Through the above method, the electronic device 500 (or the processor 520) may maintain the communication circuitry 510 in an inactive state for the interval 741 between the reception time of the SS/PBCH block 711 and the start time of the on-duration period 722, and may maintain the communication circuitry 510 in an active state (742) for the on-duration period 722. Consequently, the electronic device 500 may reduce the power (or, current) consumed due to the active state of the communication circuitry 510.

The above-described example may be applied when the SS/PBCH block 712 received during the on-duration period 722 is received before the time point at which hybrid automatic repeat and request (HARQ) is performed. This is because, to perform HARQ, the electronic device 500 must complete decoding of data received during the on-duration period 722 until HARQ is performed.

The electronic device 500 may perform data decoding using an SS/PBCH block received during the sleep-duration period 721 according to the type of service currently served by the electronic device 500. According to an embodiment, when the type of service currently served by the electronic device 500 is a service requiring low latency (e.g., ultra-reliable low-latency communication (URLLC)), to reduce the latency time, the electronic device 500 may perform data decoding using an SS/PBCH block received during the sleep-duration period 721.

Figure 8A:
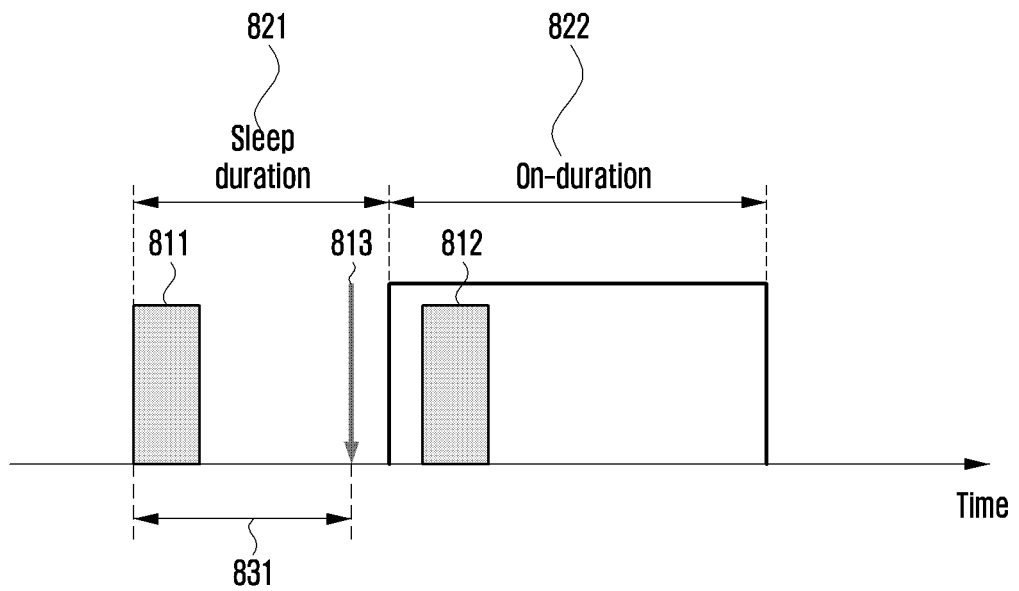
FIG. 8A is a diagram illustrating an example in which the electronic device in C-DRX mode based on a wake-up signal from the network receives an SS/PBCH block according to various embodiments.

FIG. 8A is a diagram illustrating an example in which the electronic device in C-DRX mode based on a wake-up signal from the network receives an SS/PBCH block according to various embodiments.

With reference to FIG. 8A, the electronic device (e.g., electronic device 500 in FIG. 5) may support C-DRX mode based on a wake-up signal (WUS).

The C-DRX mode may be a mode in which the electronic device 500 in RRC connected state does not receive data for a specific period (e.g., sleep duration) and receives data for another specific period (e.g., on duration), and may be a mode capable of reducing power consumed by the communication circuitry (e.g., communication circuitry 510 in FIG. 5) by transitioning the communication circuitry 510 to an inactive state for the sleep duration. The wake-up signal may be information indicating whether there is data to be received during the on-duration period. According to an embodiment, the wake-up signal may have a specific value (e.g., 1) when there is data to be received during the on-duration period, and may have another value (e.g., 0) when there is no data to be received by the electronic device 500 during the on-duration period.

The node 410 may broadcast an SS/PBCH block 811 or 812 at a specified periodicity (e.g., 20 ms). The electronic device 500 may transition the communication circuitry 510 to an active state during the sleep duration 821 to receive the SS/PBCH block 811 before the on duration 722. The electronic device 500 (or, processor 520) may decode the received SS/PBCH block 811 and synchronize with the node 410 based on a reference signal obtained through decoding. The electronic device 500 (or, processor 520) may receive a wake-up signal 813 and decode the wake-up signal 813 based on the reference signal. The electronic device 500 may check whether there is data to be received during the on-duration period 822 based on the value of the wake-up signal 813.

Based on the presence of data to be received during the on-duration period 822, the electronic device 500 (or, processor 520) may maintain the communication circuitry 510 in an active state during the on-duration period 822. Based on the absence of data to be received during the on-duration period 822, the electronic device 500 (or, processor 520) may transition the communication circuitry 510 to an inactive state during the on-duration period 822.

To receive the wake-up signal 813, the electronic device 500 may maintain the communication circuitry 510 in an active state for a period where the wake-up signal 813 is to be received. However, to obtain a reference signal for decoding the wake-up signal 813, the electronic device 500 may transition the communication circuitry 510 to an active state during a period 831 of the sleep duration 821. As the communication circuitry 510 is transitioned to an active state in the period 831 of the sleep duration 821, power consumed by the communication circuitry 510 may increase.

Based on the presence of data to be received in the on-duration period 822, the electronic device 500 may maintain the communication circuitry 510 in an active state for the on-duration 822. However, to decode data to be received during the on duration 822, the electronic device 500 may transition the communication circuitry 510 to an active state during a period 831 of the sleep duration 821. As the communication circuitry 510 is transitioned to an active state in the period 831 of the sleep duration 821, power consumed by the communication circuitry 510 may increase.

Figure 8B:
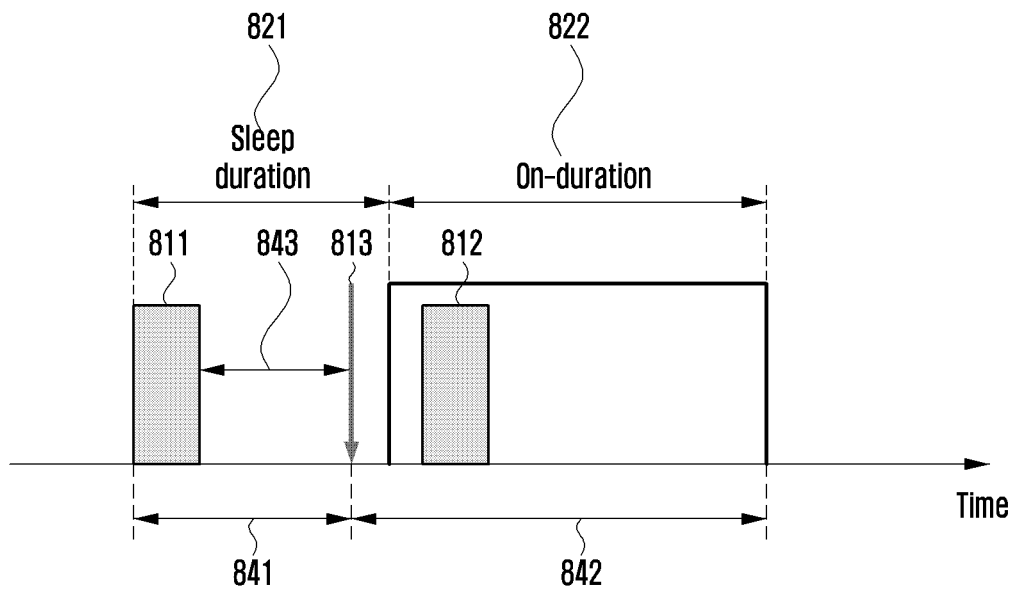
FIG. 8B is a diagram illustrating an example in which the electronic device in C-DRX mode based on a wake-up signal from the network determines the activation time of the communication circuitry based on the interval between the reception time of an SS/PBCH block and the reception time of the wake-up signal according to various embodiments.

FIG. 8B is a diagram illustrating an example in which the electronic device in C-DRX mode based on a wake-up signal from the network determines the activation time of the communication circuitry based on the interval between the reception time of an SS/PBCH block and the reception time of the wake-up signal according to various embodiments.

The electronic device 500 (or, processor 520) may identify the interval 843 between a first time being the start time of the wake-up signal 813 and a second time of receiving the SS/PBCH block 811. The electronic device 500 (or, processor 520) may check whether the identified interval 843 satisfies a specified condition. The specified condition may include a condition on whether the interval 843 between the first time and the second time is greater than or equal to a specified value. The specified value is a value related to the reception periodicity of the SS/PBCH block 811 or 812, and the specified value may be half the reception periodicity of the SS/PBCH block 811 or 812 according to an embodiment. When the reception periodicity of the SS/PBCH block 811 or 812 is 20 ms, the specified value may be 10 ms.

Based on the identified interval 843 satisfying the specified condition, the electronic device 500 (or, processor 520) may process the received wake-up signal 813 using the SS/PBCH block 812 received after the start of the on-duration period 822 (or, received after reception of the wake-up signal 813) other than the SS/PBCH block 811 transmitted before reception of the wake-up signal 813. Upon determining to process the wake-up signal 813 using the SS/PBCH block 812 received after the start time of the on-duration period 822, the electronic device 500 (or, processor 520) may determine the activation time of the communication circuitry 510 based on the reception time of the wake-up signal 813. According to an embodiment, the electronic device 500 (or, processor 520) may control the communication circuitry 510 to be activated at the reception time of the wake-up signal 813 or at a specified time before the reception time of the wake-up signal 813. The second time or a specified time before the second time may be after the reception time of the SS/PBCH block 811.

The electronic device 500 (or, processor 520) may temporarily store data received before reception of the SS/PBCH block 812 and/or the wake-up signal 813 in the memory (e.g., memory 530 in FIG. 5). The electronic device 500 (or, processor 520) may receive the SS/PBCH block 812, and decode the SS/PBCH block 812 to extract a reference signal. The electronic device 500 (or, processor 520) may decode the data stored in the memory 530 based on the reference signal.

Through the above method, the electronic device 500 (or the processor 520) may maintain the communication circuitry 510 in an inactive state for the interval 841 between the reception time of the SS/PBCH block 811 and the reception time of the wake-up signal 813, and may maintain the communication circuitry 510 in an active state for the interval 842 including the on-duration period 822 from the reception time of the wake-up signal 813. Consequently, the electronic device 500 may reduce power consumed by the communication circuitry waiting in an active state for the sleep duration 821.

Figure 8C:
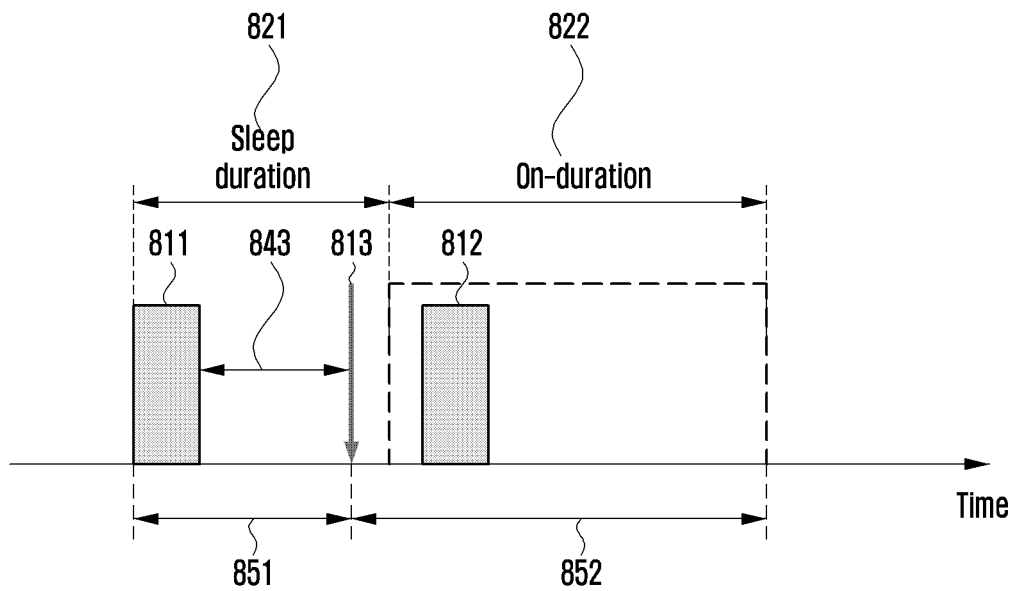
FIG. 8C is a diagram illustrating an example in which the electronic device in C-DRX mode based on a wake-up signal from the network determines the activation time of the communication circuitry based on the interval between the reception time of an SS/PBCH block and the reception time of the wake-up signal according to various embodiments.

FIG. 8C is a diagram illustrating an example in which the electronic device in C-DRX mode based on a wake-up signal from the network determines the activation time of the communication circuitry based on the interval between the reception time of an SS/PBCH block and the reception time of the wake-up signal according to various embodiments.

The electronic device 500 (or, processor 520) may identify the interval 843 between a first time being the start time of the wake-up signal 813 and a second time of receiving the SS/PBCH block 811. The electronic device 500 (or, processor 520) may check whether the identified interval 843 satisfies a specified condition. The specified condition may include a condition on whether the interval 843 between the first time and the second time is greater than or equal to a specified value. The specified value may be a value related to the reception periodicity of the SS/PBCH block 811 or 812, and the specified value may be half the reception periodicity of the SS/PBCH block 811 or 812 according to an embodiment. When the reception periodicity of the SS/PBCH block 811 or 812 is 20 ms, the specified value may be 10 ms.

Based on the identified interval 843 satisfying the specified condition, the electronic device 500 (or, processor 520) may process the received wake-up signal 813 using the SS/PBCH block 812 received after the start of the on-duration period 822 (or, received after reception of the wake-up signal 813) other than the SS/PBCH block 811 transmitted before reception of the wake-up signal 813. Upon determining to process the wake-up signal 813 using the SS/PBCH block 812 received after the start time of the on-duration period 822, the electronic device 500 (or, processor 520) may determine the activation time of the communication circuitry 510 based on the reception time of the wake-up signal 813. According to an embodiment, the electronic device 500 (or, processor 520) may control the communication circuitry 510 to be activated at the reception time of the wake-up signal 813 or at a specified time before the reception time of the wake-up signal 813. The second time or a specified time before the second time may be after the reception time of the SS/PBCH block 811.

The electronic device 500 (or, processor 520) may temporarily store the wake-up signal 813 in the memory (e.g., memory 530 in FIG. 5). The electronic device 500 (or, processor 520) may receive the SS/PBCH block 812, and decode the SS/PBCH block 812 to extract a reference signal. The electronic device 500 (or, processor 520) may decode the data stored in the memory 530 based on the reference signal. The electronic device 500 may perform decoding of the wake-up signal 813 and confirm that there is no data to be received during the on-duration period 822.

Upon confirming that there is no data to be received during the on-duration period 822, the electronic device 500 (or, processor 520) may transition the communication circuitry 510 to an inactive state.

Through the above method, the electronic device 500 (or the processor 520) may maintain the communication circuitry 510 in an inactive state for the interval 851 between the reception time of the SS/PBCH block 811 and the reception time of the wake-up signal 813, and may maintain the communication circuitry 510 in an active state for the interval 852 between the reception time of the wake-up signal 813 and the reception time of the SS/PBCH block 812. After receiving the SS/PBCH block 812, the electronic device 500 (or, processor 520) may transition the communication circuitry 510 to an inactive state. Consequently, the electronic device 500 may reduce power consumed by the communication circuitry waiting in an active state for the sleep duration 821.

Figure 9:
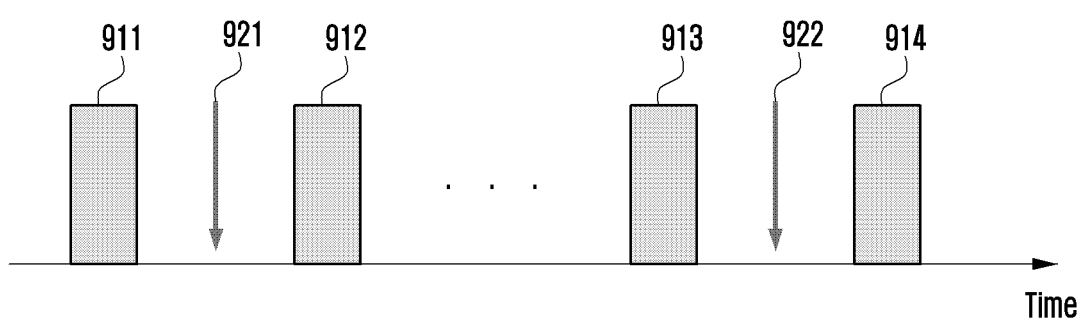
FIG. 9 is a diagram illustrating an example in which the electronic device determines whether to perform a read operation of the SS/PBCH block depending on whether communication quality satisfies a specified criterion according to various embodiments.

FIG. 9 is a diagram illustrating an example in which the electronic device determines whether to perform a read operation of the SS/PBCH block depending on whether communication quality satisfies a specified criterion according to various embodiments.

The node (e.g., node 410 in FIG. 4A) of the cellular network (e.g., cellular network 400 in FIG. 4A) may broadcast an SS/PBCH block 911, 912, 913 or 914 at specified intervals (e.g., 20 ms). The SS/PBCH block 911, 912, 913 or 914 may include a reference signal for decoding a signal transmitted by the node 410.

The electronic device 500 may control the communication circuitry (e.g., communication circuitry 510 in FIG. 5) based on the transmission periodicity of the SS/PBCH block 911, 912, 913 or 914 and the transmission periodicity of the paging message 921 or 922 obtained during registration with the cellular network 400. The electronic device 500 may transition the communication circuitry 510 to an active state to receive the SS/PBCH block 911, 912, 913 or 914 based on the transmission periodicity of the SS/PBCH block 911, 912, 913 or 914.

As in the embodiments described above in FIGS. 5 to 8C, the electronic device 500 (or, processor 520) may determine which SS/PBCH block 911 or 912 to use for decoding the paging message 921 based on the interval between the reception time of the SS/PBCH block 911 and the reception time of the paging message 921.

For example, based on the interval between the reception time of the SS/PBCH block 911 and the reception time of the paging message 921 satisfying a specified condition, the electronic device 500 may decode the paging message 921 using the SS/PBCH block 912 received after reception of the paging message 922.

In decoding the paging message 922, the electronic device 500 (or, processor 520) may perform decoding of the paging message 922 using the previously decoded SS/PBCH block 912 according to whether the specified condition is satisfied. According to an embodiment, in decoding the paging message 922, when the specified condition is satisfied, the electronic device 500 may decode the paging message 922 based on a reference signal corresponding to the previously received SS/PBCH block 912. As the electronic device 500 does not need to receive the SS/PBCH blocks 913 and 914 for decoding the paging message 922, the communication circuitry 510 may be maintained in an inactive state. When the specified condition is not satisfied, the electronic device 500 may decode the paging message 922 based on a reference signal corresponding to another SS/PBCH block 913 or 914.

The specified condition may be a criterion related to the quality of communication used by the electronic device 500.

According to an embodiment, the specified condition may be a condition related to stability of an electric field in which the electronic device 500 is located. For example, the specified condition may include a condition that the node (e.g., node 410 in FIG. 4A) transmitting the SS/PBCH block 912 and the node 410 transmitting another SS/PBCH block 913 are the same, a condition that a change (e.g., fluctuation) in quality (e.g., RSRP, SINR) of a signal transmitted by the node 410 is less than or equal to a specified value (e.g., 4.5 dB for RSRP, 3 dB for SINR), and/or a condition that the quality (e.g., SINR) of a signal transmitted by the node 410 is greater than or equal to a specified value (e.g., 20 dB).

As another example, based on the interval between the reception time of the SS/PBCH block 911 and the reception time of the paging message 921 not satisfying the specified condition, the electronic device 500 may activate the communication circuitry 510 before receiving the paging message 921. The electronic device 500 may decode the paging message 921 using the SS/PBCH block 911 received before receiving the paging message 921.

In decoding the paging message 922, the electronic device 500 (or, processor 520) may perform decoding of the paging message 922 using the previously decoded SS/PBCH block 911 according to whether the specified condition is satisfied. According to an embodiment, in decoding the paging message 922, when the specified condition is satisfied, the electronic device 500 may decode the paging message 922 based on a reference signal corresponding to the previously received SS/PBCH block 911. As the electronic device 500 does not need to receive the SS/PBCH blocks 913 and 914 for decoding the paging message 922, the communication circuitry 510 may be maintained in an inactive state. When the specified condition is not satisfied, the electronic device 500 may decode the paging message 922 based on a reference signal corresponding to another SS/PBCH block 913 or 914.

According to the embodiments described above, the electronic device 500 may not transition the communication circuitry 510 to an active state to receive an SS/PBCH block, thereby reducing power consumption due to the communication circuitry 510.

An electronic device according to various example embodiments of the disclosure may include: a memory; communication circuitry configured to transmit and receive data via a node; and a communication processor, wherein the communication processor may be configured to: identify a first time of receiving a paging message and a second time of receiving a synchronization signal/physical broadcast channel (SS/PBCH) block; determine, based on the first time and the second time satisfying a specified condition, the activation time of the communication circuitry based on the reception time of the paging message; receive a paging message; temporarily store the received paging message in the memory; and process the stored paging message based on an SS/PBCH block received after reception of the paging message.

In the electronic device according to various example embodiments of the disclosure, the specified condition may include a condition for whether the interval between the first time and the second time is greater than or equal to a specified value.

In the electronic device according to various example embodiments of the disclosure, based on the quality of a signal transmitted by the node satisfying a specified condition, the communication processor may be configured to process a paging message received after the paging message based on the SS/PBCH block.

In the electronic device according to various example embodiments of the disclosure, based on the specified condition being satisfied, the communication processor may be configured to control the communication circuitry to be activated between the reception time of an SS/PBCH block transmitted before reception of the paging message and the reception time of the paging message.

In the electronic device according to various example embodiments of the disclosure, based on the specified condition not being satisfied, the communication processor may be configured to control the communication circuitry to be activated before the reception time of an SS/PBCH block transmitted before the reception of the paging message.

In the electronic device according to various example embodiments of the disclosure, based on the interval not satisfying the specified condition, the communication processor may be configured to process the paging message based on an SS/PBCH block received before reception of the paging message.

In the electronic device according to various example embodiments of the disclosure, the communication processor may be configured to: receive an SS/PBCH block in the process of searching for the node; identify the frame number of the SS/PBCH block based on system information transmitted by the node; identify the frame number of the paging message based on information received from the network corresponding to the node; and identify the interval based on the frame number of the synchronization signal block (SSB) and the frame number of the paging message.

In the electronic device according to various example embodiments of the disclosure, the specified value may be half a reception interval between SS/PBCH blocks.

An electronic device according to various example embodiments of the disclosure may include: a memory; communication circuitry configured to transmit and receive data via a node; and a communication processor, wherein the communication processor may be configured to: identify a first time being the start time of an on-duration period in which data reception is possible in connected mode discontinuous reception (C-DRX) mode, and a second time of receiving a synchronization signal/physical broadcast channel (SS/PBCH) block; determine, based on the first time and the second time satisfying a specified condition, an activation time of the communication circuitry based on the start time of the on-duration period; receive data; temporarily store the received data in the memory; and process the stored data based on an SS/PBCH block received during the on-duration period.

In the electronic device according to various example embodiments of the disclosure, the specified condition may include a condition for whether the interval between the first time and the second time is greater than or equal to a specified value.

In the electronic device according to various example embodiments of the disclosure, the specified value may be half a reception interval between SS/PBCH blocks.

In the electronic device according to various example embodiments of the disclosure, based on the specified condition being satisfied, the communication processor may be configured to control the communication circuitry to be activated between the reception time of an SS/PBCH block transmitted before the on-duration period and the start time of the on-duration period.

In the electronic device according to various example embodiments of the disclosure, based on the specified condition not being satisfied, the communication processor may be configured to control the communication circuitry to be activated at the reception time of an SS/PBCH block transmitted before the on-duration period.

In the electronic device according to various example embodiments of the disclosure, based on the interval not satisfying the specified condition, the communication processor may be configured to process the data based on an SS/PBCH block received before the on-duration period.

An electronic device according to various example embodiments of the disclosure may include: a memory; communication circuitry configured to transmit and receive data via a node; and a communication processor, wherein the communication processor may be configured to: identify a first time of receiving a wake-up signal indicating presence of data to be transmitted in an on-duration period in which data can be received in connected mode discontinuous reception (C-DRX) mode and a second time of receiving a synchronization signal/physical broadcast channel (SS/PBCH) block; determine, based on the first time and the second time satisfying a specified condition, an activation time of the communication circuitry based on the first time; receive the wake-up signal; temporarily store the received wake-up signal in the memory; and process the stored wake-up signal based on an SS/PBCH block received during the on-duration period.

In the electronic device according to various example embodiments of the disclosure, the specified condition may include a condition for whether the interval between the first time and the second time is greater than or equal to a specified value.

In the electronic device according to various example embodiments of the disclosure, the specified value may be half a reception interval between SS/PBCH blocks.

In the electronic device according to various example embodiments of the disclosure, based on the specified condition being satisfied, the communication processor may be configured to control the communication circuitry to be activated at the reception time of the wake-up signal.

In the electronic device according to various example embodiments of the disclosure, based on the specified condition not being satisfied, the communication processor may be configured to control the communication circuitry to be activated at the reception time of an SS/PBCH block transmitted before reception of the wake-up signal.

In the electronic device according to various example embodiments of the disclosure, based on the interval not satisfying the specified condition, the communication processor may be configured to process the wake-up signal based on an SS/PBCH block received before reception of the wake-up signal.

Figure 10:
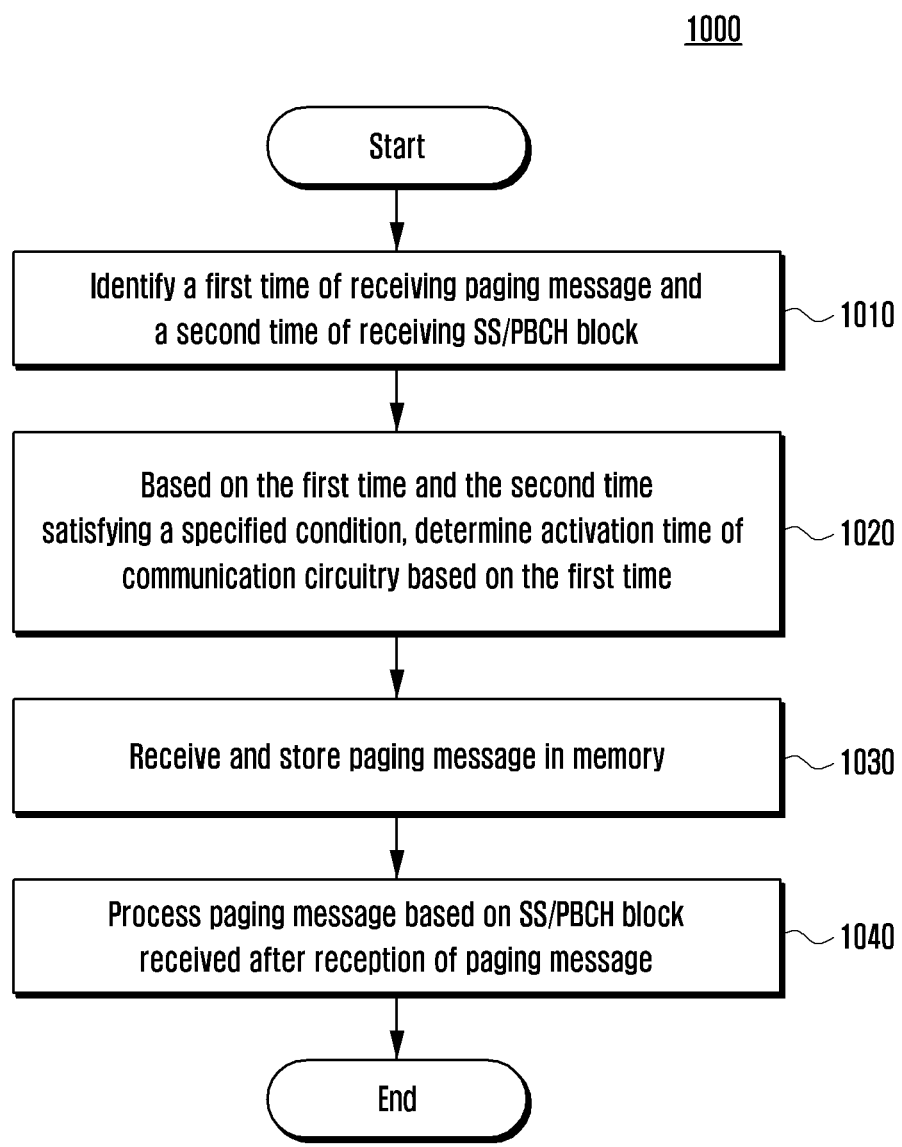
FIG. 10 is a flowchart illustrating an example method of operating the electronic device according to various embodiments.

FIG. 10 is a flowchart illustrating an example method of operating the electronic device according to various embodiments.

With reference to FIG. 10, at operation 1010, the electronic device (e.g., electronic device 500 in FIG. 5) may identify a first time of receiving a paging message (e.g., paging message 431 in FIG. 4B) and a second time of receiving an SS/PBCH block (e.g., SS/PBCH block 424 in FIG. 4B).

The electronic device 500 may identify the interval between the first time and the second time, and may check whether the identified interval satisfies a specified condition. The specified condition may include a condition on whether the interval 451 between the first time and the second time is greater than or equal to a specified value. The specified value is a value related to the reception periodicity of the SS/PBCH block 424, and the specified value may be half the reception periodicity of the SS/PBCH block 424 according to an embodiment. In this case, the interval 451 between the first time and the second time may be greater than the interval 452 between the second time and a third time of receiving the SS/PBCH block 425 after reception of the paging message 432.

At operation 1020, based on the interval satisfying the specified condition, the electronic device 500 may determine the activation time of the communication circuitry 510 on the basis of the first time.

Based on the identified interval 451 satisfying the specified condition, the electronic device 500 may process the paging message 432 using the SS/PBCH block 425 received after reception of the paging message 432 other than the SS/PBCH block 424 received before reception of the paging message 432. Upon determining to process the paging message 432 using the SS/PBCH block 425 received after reception of the paging message 432, the electronic device 500 may determine the activation time of the communication circuitry 510 based on the second time at which the paging message 432 is received. According to an embodiment, the electronic device 500 may control the communication circuitry 510 to be activated at the second time when the paging message 432 is received or at a specified time before the second time. The second time or a specified time before the second time may be after the reception time of the SS/PBCH block 424. Through the above method, the electronic device 500 may maintain the communication circuitry 510 in an inactive state for the interval 611 between the reception time of the paging message 432 and the reception time of the SS/PBCH block 424. The electronic device 500 may maintain the communication circuitry 510 in an active state for the interval 612 between the reception time of the paging message 432 and the reception time of the SS/PBCH block 425.

At operation 1030, the electronic device 500 may receive the paging message 432 and store it in the memory (e.g., memory 530 in FIG. 5).

The electronic device 500 may activate the communication circuitry 510 before receiving the paging message 432, and may control the communication circuitry 510 to receive the paging message 432. The electronic device 500 may temporarily store the received paging message 432 in the memory 530.

At operation 1040, the electronic device 500 may process the paging message 432 based on the SS/PBCH block (e.g., SS/PBCH block 425 in FIG. 4B) received after reception of the paging message 432.

After receiving the paging message 432, the electronic device 500 may receive the SS/PBCH block 425 and extract a reference signal by decoding the SS/PBCH block 425. The electronic device 500 may decode the paging message 432 temporarily stored in the memory 530 using the extracted reference signal. The electronic device 500 may determine whether to transition from RRC idle state to RRC connected state based on information extracted through decoding of the paging message 432.

Figure 11:
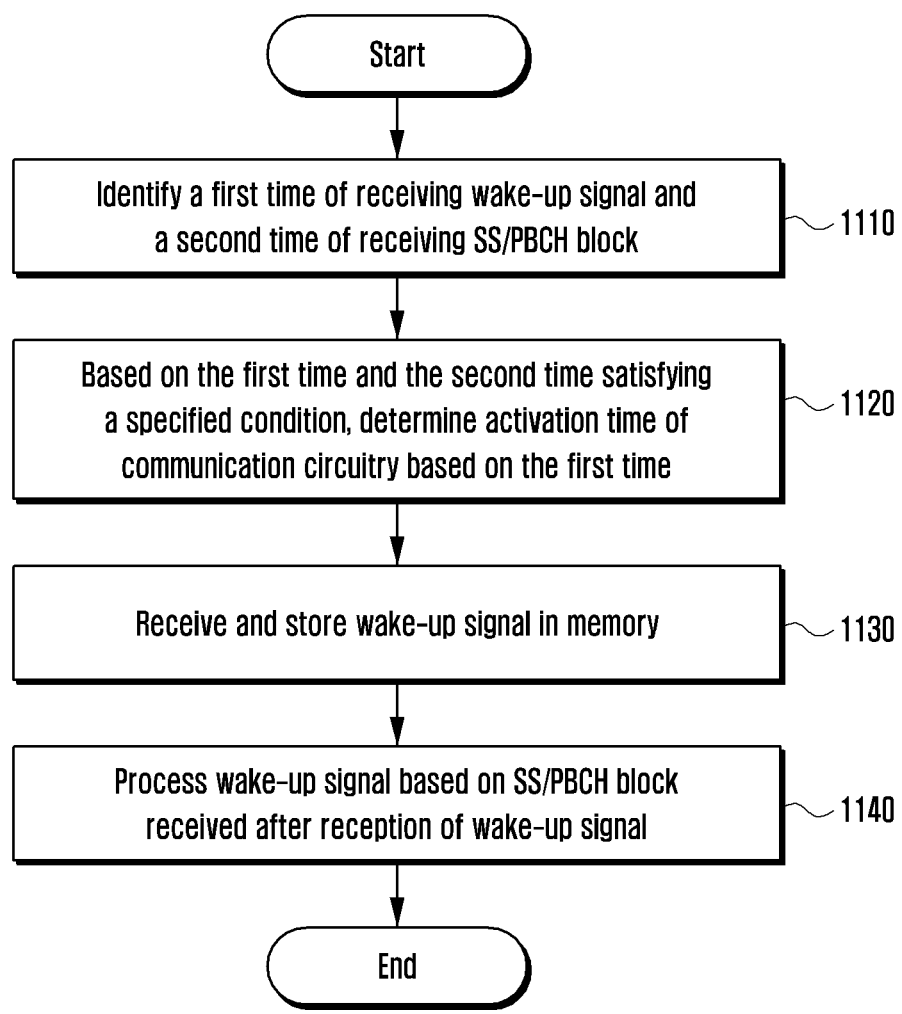
FIG. 11 is a flowchart illustrating an example method of operating the electronic device according to various embodiments.

FIG. 11 is a flowchart illustrating an example method of operating the electronic device according to various embodiments.

With reference to FIG. 11, at operation 1110, the electronic device (e.g., electronic device 500) may identify a first time of receiving a wake-up signal (e.g., wake-up signal 813 in FIG. 8B) and a second time of receiving an SS/PBCH block (e.g., SS/PBCH block 811 in FIG. 8B).

The electronic device 500 (or, processor 520) may check whether the first time and the second time satisfy a specified condition. According to an embodiment, the electronic device 500 may check whether the interval 843 between the first time and the second time satisfies a specified condition. The specified condition may include a condition on whether the interval 843 between the first time and the second time is greater than or equal to a specified value. The specified value is a value related to the reception periodicity of the SS/PBCH block 811 or 812, and the specified value may be half the reception periodicity of the SS/PBCH block 811 or 812 according to an embodiment. When the reception periodicity of the SS/PBCH block 811 or 812 is 20 ms, the specified value may be 10 ms.

At operation 1120, based on the interval satisfying the specified condition, the electronic device 500 may determine the activation time of the communication circuitry 510 based on the first time.

Based on the identified interval 843 satisfying the specified condition, the electronic device 500 (or, processor 520) may process the received wake-up signal 813 using the SS/PBCH block 812 received after the start of the on-duration period 822 (or, received after reception of the wake-up signal 813) other than the SS/PBCH block 811 transmitted before reception of the wake-up signal 813. Upon determining to process the wake-up signal 813 using the SS/PBCH block 812 received after the start time of the on-duration period 822, the electronic device 500 (or, processor 520) may determine the activation time of the communication circuitry 510 based on the reception time of the wake-up signal 813. According to an embodiment, the electronic device 500 (or, processor 520) may control the communication circuitry 510 to be activated at the reception time of the wake-up signal 813 or at a specified time before the reception time of the wake-up signal 813. The second time or a specified time before the second time may be after the reception time of the SS/PBCH block 811.

At operation 1130, the electronic device 500 may receive the wake-up signal 813 and store it in the memory (e.g., memory 530 in FIG. 5).

The electronic device 500 may activate the communication circuitry 510 before the first time of receiving the wake-up signal 813, and control the communication circuitry 510 to receive the wake-up signal 813. The electronic device 500 may maintain the communication circuitry 510 in an inactive state at the reception time of the SS/PBCH block 811 transmitted before reception of the wake-up signal 813. The electronic device 500 may temporarily store the received wake-up signal 813 in the memory 530.

At operation 1140, the electronic device 500 may process the wake-up signal 813 based on the SS/PBCH block (e.g., SS/PBCH block 812 in FIG. 8B) received after reception of the wake-up signal 813.

After receiving the wakeup signal 813, the electronic device 500 may receive the SS/PBCH block 812 and extract a reference signal by decoding the SS/PBCH block 812. The electronic device 500 may decode the wake-up signal 813 temporarily stored in the memory 530 using the extracted reference signal.

A method of operating an electronic device according to various example embodiments of the disclosure may include: identifying a first time of receiving a paging message and a second time of receiving an SS/PBCH block; determining, based on the first time and the second time satisfying a specified condition, an activation time of a communication circuitry based on a reception time of the paging message; receiving a paging message; temporarily storing the received paging message in a memory; and processing the stored paging message based on an SS/PBCH block received after reception of the paging message.

In the method of operating the electronic device according to various example embodiments of the disclosure, the specified condition may include a condition for whether the interval between the first time and the second time is greater than or equal to a specified value.

In the method of operating the electronic device according to various example embodiments of the disclosure, the specified value may be half a reception interval between SS/PBCH blocks.

In the method of operating the electronic device according to various example embodiments of the disclosure, determining the activation time of a communication circuitry based on the reception time of the paging message may include determining, based on the specified condition being satisfied, the activation time so that the communication circuitry is activated between the reception time of an SS/PBCH block transmitted before reception of the paging message and the reception time of the paging message.

The method of operating the electronic device according to various example embodiments of the disclosure may further include controlling, based on the specified condition not being satisfied, the communication circuitry so that the communication circuitry is activated before the reception time of an SS/PBCH block transmitted before reception of the paging message.

The method of operating the electronic device according to various example embodiments of the disclosure may further include processing, based on the interval not satisfying the specified condition, the paging message based on an SS/PBCH block received before reception of the paging message.

In the method of operating the electronic device according to various example embodiments of the disclosure, identifying the interval between the first time and the second time may include: receiving an SS/PBCH block in a process of searching for a node; identifying a frame number of the SS/PBCH block based on system information transmitted by the node; identifying a frame number of the paging message based on information received from the network corresponding to the node; and identifying the interval based on the frame number of the SS/PBCH block and the frame number of the paging message.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
   memory;
   a communication circuitry; and
   a communication processor,
   wherein the communication processor is configured to:
   identify a first time of receiving a paging message and a second time of receiving a synchronization signal/physical broadcast channel (SS/PBCH) block;
   identify whether an interval between the first time and the second time is greater than or equal to a specified value being related to a reception periodicity of the SS/PBCH block,
   based on the identification that the interval between the first time and the second time is less than the specified value,
   receive a first SS/PBCH block,
   receive the paging message after receiving the first SS/PBCH block, and
   process the paging message based on the first SS/PBCH block,
   based on the identification that the interval between the first time and the second time is greater than or equal to the specified value,
   receive the paging message without receiving the first SS/PBCH block;
   store the received paging message in the memory;
   receive a second SS/PBCH block after receiving the paging message; and
   process the stored paging message based on the second SS/PBCH block received after reception of the paging message.

2. The electronic device of claim 1, wherein, based on a quality of a signal transmitted by the node satisfying a specified condition, the communication processor is configured to process a paging message received after the paging message based on the second SS/PBCH block.

3. The electronic device of claim 1, wherein, based on the interval between the first time and the second time being greater than or equal to a specified value, the communication processor is configured to control the communication circuitry to be activated between a reception time of an SS/PBCH block transmitted before reception of the paging message and the reception time of the paging message.

4. The electronic device of claim 1, wherein, based on the interval between the first time and the second time not being greater than or equal to the specified value, the communication processor is configured to control the communication circuitry to be activated before a reception time of an SS/PBCH block transmitted before reception of the paging message.

5. The electronic device of claim 4, wherein, based on the interval between the first time and the second time not being greater than or equal to the specified value, the communication processor is configured to process the paging message based on an SS/PBCH block received before reception of the paging message.

6. The electronic device of claim 1, wherein the communication processor is configured to:
receive an SS/PBCH block in a process of searching for the node;
identify a frame number of the SS/PBCH block based on system information transmitted by the node;
identify a frame number of the paging message based on information received from a network corresponding to the node; and
identify an interval between the first time and the second time based on the frame number of the synchronization signal block (SSB) and the frame number of the paging message.

7. An electronic device supporting connected mode discontinuous reception (C-DRX) mode, comprising:
memory;
a communication circuitry; and
a communication processor,
wherein the communication processor is configured to:
identify a first time being a start time of an on-duration period in which data reception is possible in C-DRX, and a second time of receiving a synchronization signal/physical broadcast channel (SS/PBCH) block;
identify whether an interval between the first time and the second time is greater than or equal to a specified value being related to a reception periodicity of the SS/PBCH block,
based on the identification that the interval between the first time and the second time is less than the specified value,
receive a first SS/PBCH block,
receive the data after receiving the first SS/PBCH block, and
process the data based on the first SS/PBCH block,
based on the identification that the interval between the first time and the second time is greater than or equal to the specified value,
receive the data without receiving the first SS/PBCH block,
store the received data in the memory,
receive a second SS/PBCH block after receiving the data, and
process the stored data based on the second SS/PBCH block received during the on-duration period.

8. The electronic device of claim 7, wherein the specified value is half a reception interval between SS/PBCH blocks.

9. The electronic device of claim 7, wherein, based on the interval between the first time and the second time being greater than or equal to the specified value, the communication processor is configured to control the communication circuitry to be activated between a reception time of an SS/PBCH block transmitted before the on-duration period and the start time of the on-duration period.

10. The electronic device of claim 7, wherein, based on the interval between the first time and the second time not being greater than or equal to the specified value, the communication processor is configured to control the communication circuitry to be activated at a reception time of an SS/PBCH block transmitted before the on-duration period.

11. The electronic device of claim 10, wherein, based on the interval between the first time and the second time not being greater than or equal to the specified value, the communication processor is configured to process data based on an SS/PBCH block received before the on-duration period.

12. A method of operating an electronic device, the method comprising:
identifying a first time of receiving a paging message and a second time of receiving an SS/PBCH block;
identifying whether an interval between the first time and the second time is greater than or equal to a specified value being related to a reception periodicity of the SS/PBCH block;
based on the identification that the interval between the first time and the second time is less than the specified value,
receiving a first SS/PBCH block,
receiving the paging message after receiving the first SS/PBCH block, and
processing the paging message based on the first SS/PBCH block,
based on the identification that the interval between the first time and the second time is greater than or equal to the specified value,
receiving the paging message without receiving the first SS/PBCH block;
storing the received paging message in a memory;
receiving a second SS/PBCH block after receiving the paging message; and
processing the stored paging message based on the second SS/PBCH block received after reception of the paging message.

13. The method of claim 12, wherein the specified value is half a reception interval between SS/PBCH blocks.

14. The method of claim 12, wherein determining an activation time of a communication circuitry based on a reception time of the paging message comprises determining, based on the interval between the first time and the second time being greater than or equal to the specified value, the activation time to activate the communication circuitry between a reception time of an SS/PBCH block transmitted before reception of the paging message and the reception time of the paging message.

15. The method of claim 12, further comprising controlling, based on the interval between the first time and the second time not being greater than or equal to the specified value, the communication circuitry to be activated before a reception time of an SS/PBCH block transmitted before reception of the paging message.

16. The method of claim 15, further comprising processing, based on the interval between the first time and the second time not being greater than or equal to the specified value, the paging message based on an SS/PBCH block received before reception of the paging message.

17. The method of claim 12, wherein identifying an interval between the first time and the second time comprises:
receiving an SS/PBCH block in a process of searching for a node;
identifying a frame number of the SS/PBCH block based on system information transmitted by the node;
identifying a frame number of the paging message based on information received from a network corresponding to the node; and identifying the interval based on the frame number of the SS/PBCH block and the frame number of the paging message.

* * * * *